United States Patent
Kim

(10) Patent No.: US 9,917,992 B2
(45) Date of Patent: Mar. 13, 2018

(54) CAMERA MODULE

(71) Applicant: LG INNOTEK CO., LTD., Seoul (KR)

(72) Inventor: Min Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 3 days.

(21) Appl. No.: 15/050,838

(22) Filed: Feb. 23, 2016

(65) Prior Publication Data

US 2016/0173745 A1 Jun. 16, 2016

Related U.S. Application Data

(62) Division of application No. 13/953,338, filed on Jul. 29, 2013, now Pat. No. 9,297,978.

(30) Foreign Application Priority Data

Jul. 30, 2012 (KR) .................. 10-2012-0083027

(51) Int. Cl.
*G02B 7/02* (2006.01)
*H04N 5/225* (2006.01)
(Continued)

(52) U.S. Cl.
CPC ............ *H04N 5/2253* (2013.01); *G02B 7/04* (2013.01); *G02B 7/09* (2013.01); *G03B 3/10* (2013.01);
(Continued)

(58) Field of Classification Search
CPC ......... H01L 27/14618; H01L 27/14625; H01L 27/14621; H01L 27/14623; H04N 5/2254; H04N 5/2253; H04N 5/2257; H04N 5/2251; H04N 2201/03133; H04N 2201/03179; H04N 2201/03191; G02B 7/006; G02B 7/02; G02B 7/021; G02B 7/08; G02B 7/102
(Continued)

(56) References Cited

U.S. PATENT DOCUMENTS 6,346,777 B1 * 2/2002 Kim .................. H05B 33/0803
315/185 R
2009/0045476 A1 2/2009 Peng et al.
(Continued)

FOREIGN PATENT DOCUMENTS

CN 102150073 A 8/2011
KR 10-2012-0021085 A 3/2012
(Continued)

*Primary Examiner* — James Greece
(74) *Attorney, Agent, or Firm* — Birch, Stewart, Kolasch & Birch, LLP

(57) ABSTRACT

A first exemplary embodiment of the present disclosure includes a PCB (Printed Circuit Board) mounted with an image sensor, a holder member mounted on the PCB, a lens module directly mounted inside the holder member, an actuator arranged at an inside of the holder member, and an electronic circuit pattern formed on a surface of the holder member to conductibly connect the PCB and the actuator, where one end of the electronic circuit pattern is connected to the PCB, and the other end of the electronic circuit pattern is connected to the actuator.

14 Claims, 6 Drawing Sheets

(51) Int. Cl.
  *G02B 7/04*      (2006.01)
  *G03B 3/10*      (2006.01)
  *G03B 17/02*     (2006.01)
  *H04N 5/232*     (2006.01)
  *G02B 7/09*      (2006.01)

(52) U.S. Cl.
  CPC ........... *G03B 17/02* (2013.01); *H04N 5/2252* (2013.01); *H04N 5/2254* (2013.01); *H04N 5/23212* (2013.01); *H04N 5/23287* (2013.01); *G03B 2205/0007* (2013.01); *G03B 2205/0053* (2013.01)

(58) Field of Classification Search
  USPC ................. 359/811, 819, 824; 250/208.1
  See application file for complete search history.

(56) References Cited

U.S. PATENT DOCUMENTS

| | | | |
|---|---|---|---|
| 2010/0091120 A1* | 4/2010 | Nagata | G02B 27/646 348/208.4 |
| 2011/0134303 A1 | 6/2011 | Jung et al. | |
| 2012/0206050 A1* | 8/2012 | Spero | B60Q 1/04 315/152 |

FOREIGN PATENT DOCUMENTS

| | | |
|---|---|---|
| WO | WO 2010/029316 A2 | 3/2010 |
| WO | WO 2010/129454 A1 | 11/2010 |
| WO | WO 2011/145907 A2 | 11/2011 |
| WO | WO 2012/077915 A1 | 6/2012 |

\* cited by examiner

CAMERA MODULE

CROSS REFERENCE TO RELATED APPLICATIONS

This application is a Divisional Application of co-pending U.S. application Ser. No. 13/953,338 filed on Jul. 29, 2013, which claims priority under 35 U.S.C 119(a) to Patent Application No. 10-2012-0083027 filed in the Republic of Korea on Jul. 30, 2012, all of which are hereby expressly incorporated by reference into the present application.

BACKGROUND OF THE DISCLOSURE

Field of Endeavor

The teachings in accordance with exemplary and non-limiting embodiments of this disclosure relate generally to a camera module.

Background

In a case an auto focusing operation is carried out in a conventional camera module, an AF (Auto Focus) terminal and a PCB AF pad must be conductibly connected to drive an actuator, which is disadvantageously susceptible to shock.

Particularly, development of a camera module configured to maintain an auto focusing function and handshake compensation function, and yet to minimize a height of the camera module is required by a user needs to a slimmer camera module installed on small-sized electronic products such as notebooks, smart phones and tablet personal computers.

SUMMARY OF THE DISCLOSURE

Exemplary and non-limiting embodiments of this disclosure are to provide a structure-improved camera module configured to maintain an auto focusing function and handshake compensation function, and yet to minimize a height of the camera module.

In a first exemplary embodiment of the present disclosure, there is provided a camera module, the camera module comprising: a PCB (Printed Circuit Board) mounted with an image sensor;
a holder member mounted on the PCB;
a lens module directly mounted inside the holder member;
an actuator arranged at an upper surface of the holder member; and an electronic circuit pattern formed on a surface of the holder member to conductibly connect the PCB and the actuator, where one end of the electronic circuit pattern is connected to the PCB, and the other end of the electronic circuit pattern is connected to the actuator.

In some exemplary embodiments of the present disclosure, the lens module may be formed by any one of a lens unit formed with one or more lenses and a lens barrel arranged with lenses.

In some exemplary embodiments of the present disclosure, the camera module may further comprise a shield can wrapping a lateral surface and an upper surface of the holder member, an insulation member may be interposed between the shield can and the holder member, and the insulation member may be an epoxy.

In some exemplary embodiments of the present disclosure, a protective guide member may be interposed between the shield can and the holder member, and the protective guide member may prevent an exposed surface of the electronic circuit pattern formed at an upper surface of the holder member from being short-circuited with the shield can.

In a second exemplary embodiment of the present disclosure, there is provided a camera module, the camera module comprising:
a PCB (Printed Circuit Board) mounted with an image sensor; a guide holder mounted on the PCB;
a lens module directly mounted inside the holder member;
an actuator arranged inside the guide holder; and
an electronic circuit pattern formed on a surface of the holder member to conductibly connect the PCB and the actuator, where one end of the electronic circuit pattern is connected to the PCB, and the other end of the electronic circuit pattern is connected to the actuator.

In some exemplary embodiments of the present disclosure, the guide holder may be formed with the electronic circuit pattern at a lateral surface, an upper surface and at an inner circumferential surface accommodated by the actuator, and a shield can may be included that wraps a lateral surface of the guide holder while being discrete from an upper surface.

In some exemplary embodiments of the present disclosure, an insulation member may be interposed between the shield can and the guide holder.

In a third exemplary embodiment of the present disclosure, there is provided a camera module, the camera module comprising:
a PCB (Printed Circuit Board) mounted with an image sensor; an actuator holder mounted at an upper surface of the PCB and formed at an upper surface with a through hole;
a lens module directly mounted inside the actuator holder member;
an actuator arranged inside the actuator holder; and an electronic circuit pattern formed on a surface of the actuator holder to conductibly connect the PCB and the actuator, where one end of the electronic circuit pattern is connected to the PCB, and the other end of the electronic circuit pattern is connected to the actuator.

In some exemplary embodiments of the present disclosure, an upper surface of the actuator holder may be so formed as to wrap the actuator, and the through hole may be arranged at a position corresponding to a terminal unit of the actuator.

In some exemplary embodiments of the present disclosure, at least two through holes may be provided.

In some exemplary embodiments of the present disclosure, the electronic circuit pattern may be formed at a lateral surface and an upper surface of the actuator and at an inner circumferential surface of the through hole.

In some exemplary embodiments of the present disclosure, the actuator may be connected to the electronic circuit pattern at a surface facing the through hole.

In a fourth exemplary embodiment of the present disclosure, a camera module may be formed with a configuration same as that of the third exemplary embodiment of the present disclosure, but may be additionally formed with an outermost lens arranged at an upper surface of the actuator.

In some exemplary embodiments of the present disclosure, a diameter of the outermost lens may be formed smaller than that of the actuator or other lenses.

The actuator according to the first to fourth exemplary embodiments of the present disclosure may include any one of a MEMS (Micro Electric Mechanical System) actuator moved by using an electrostatic force and a piezoelectric force, a liquid crystal lens, a piezoelectric polymer lens, a non-MEMS actuator, a silicon type actuator, and a liquid lens, or a combination of at least two such actuators.

In some exemplary embodiments of the present disclosure, the actuator may perform an auto focusing function or a handshake compensation function through changes in thickness or shape of a fixed lens or changes in refractive indexes of incident light.

In some exemplary embodiments of the present disclosure, the electronic circuit pattern and the actuator may be connected using a soldering, an Ag epoxy, a conductive epoxy or a wire bonding.

Exemplary embodiments of the present disclosure have an advantageous effect in that handshake compensation function and auto focusing function can be performed by changes in refractive indexes of incident light and changes in thickness or shapes of fixed lens, free from horizontal, vertical and tilting movement of a lens, and a height of a camera module can be reduced to enable a miniaturization of the camera module.

DETAILED DESCRIPTION

Hereinafter, exemplary embodiments of the present disclosure will be described in detail with reference to the accompanying drawings.

Figure 1:
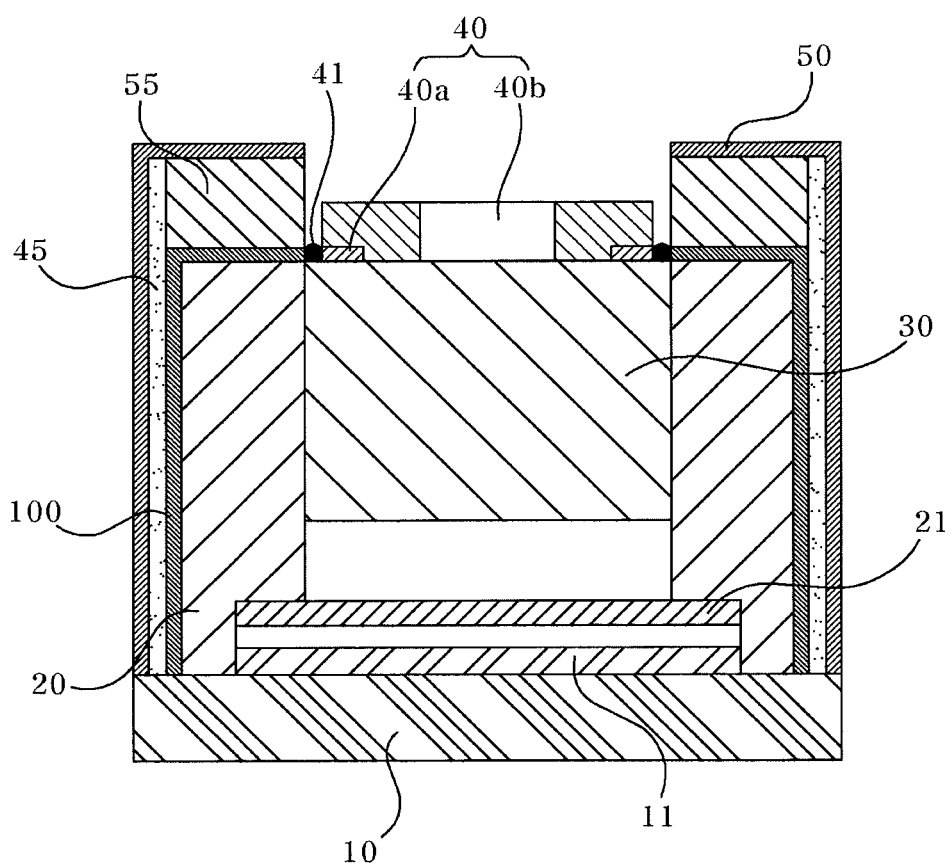
FIGS. 1 and 2 are schematic cross-sectional views illustrating a camera module according to a first exemplary embodiment of the present disclosure.
Figure 2:
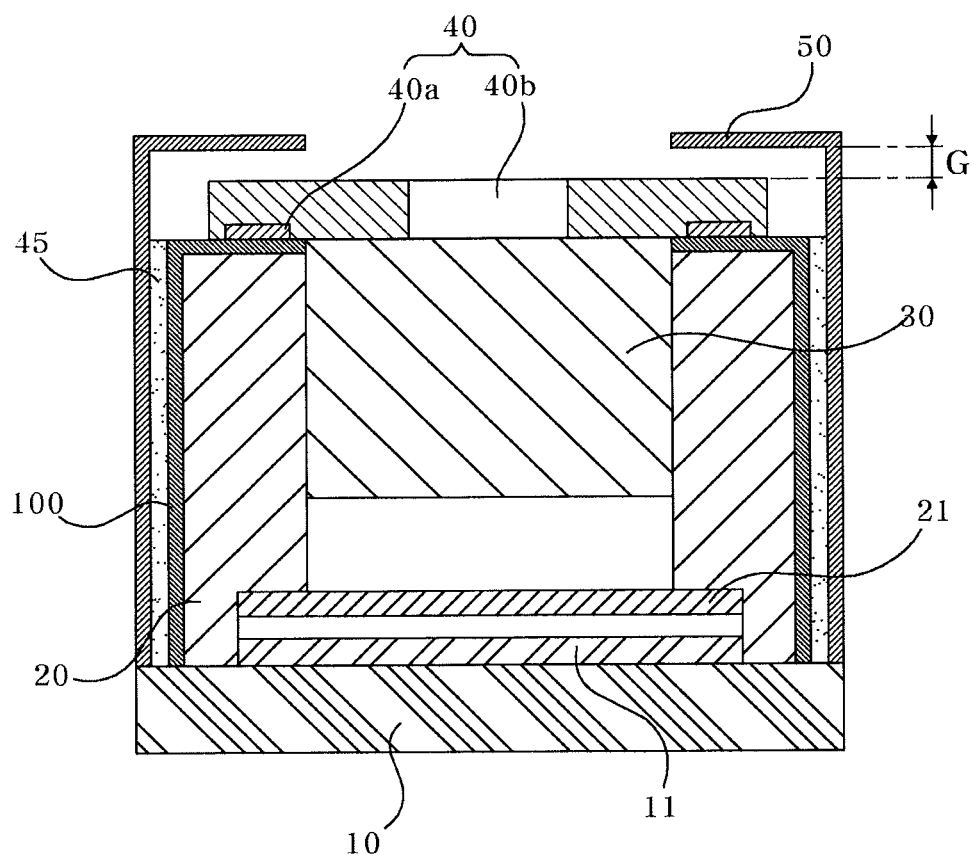
Figure 3:
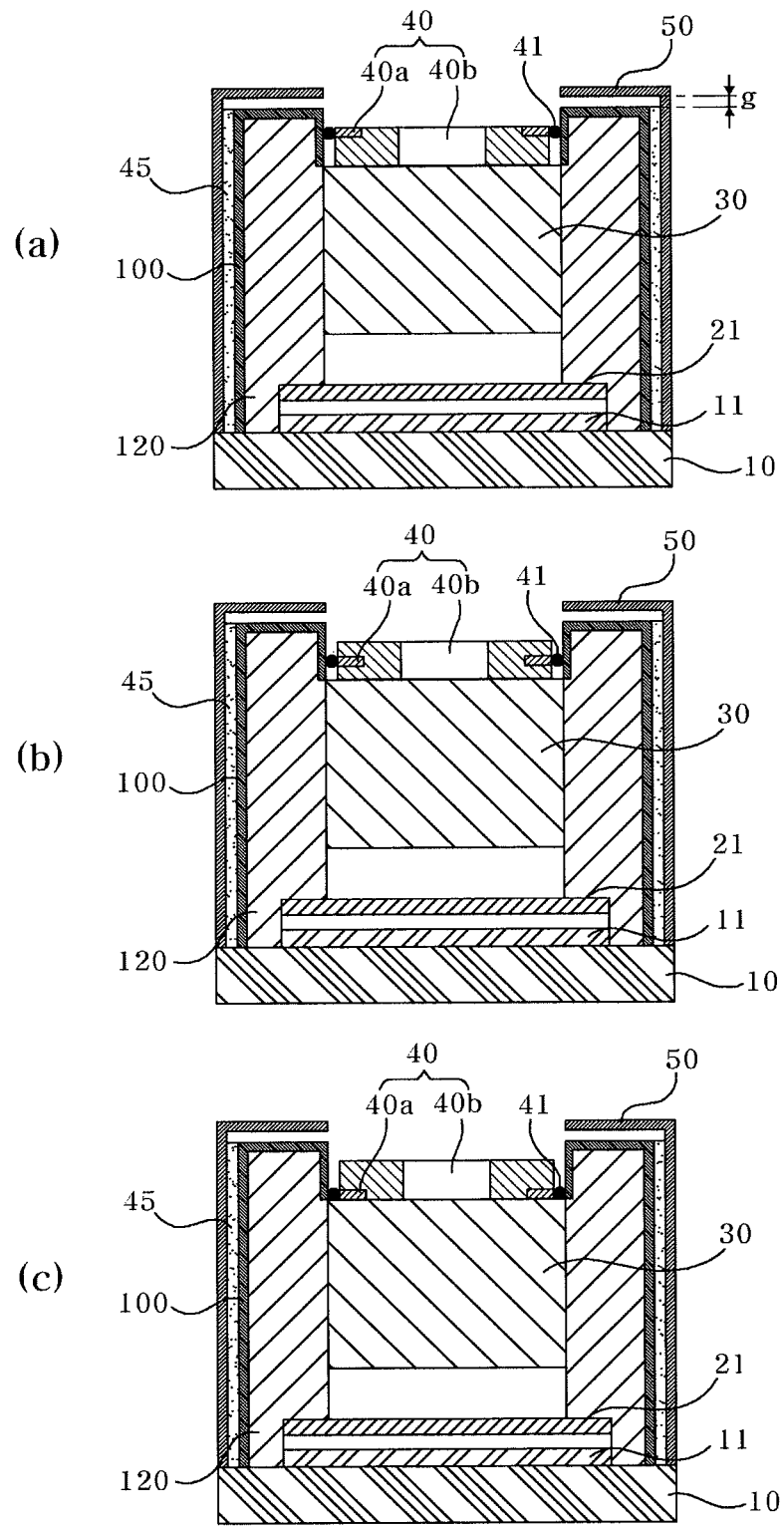
FIG. 3 is a schematic cross-sectional view illustrating a camera module according to a second exemplary embodiment of the present disclosure.
Figure 4:
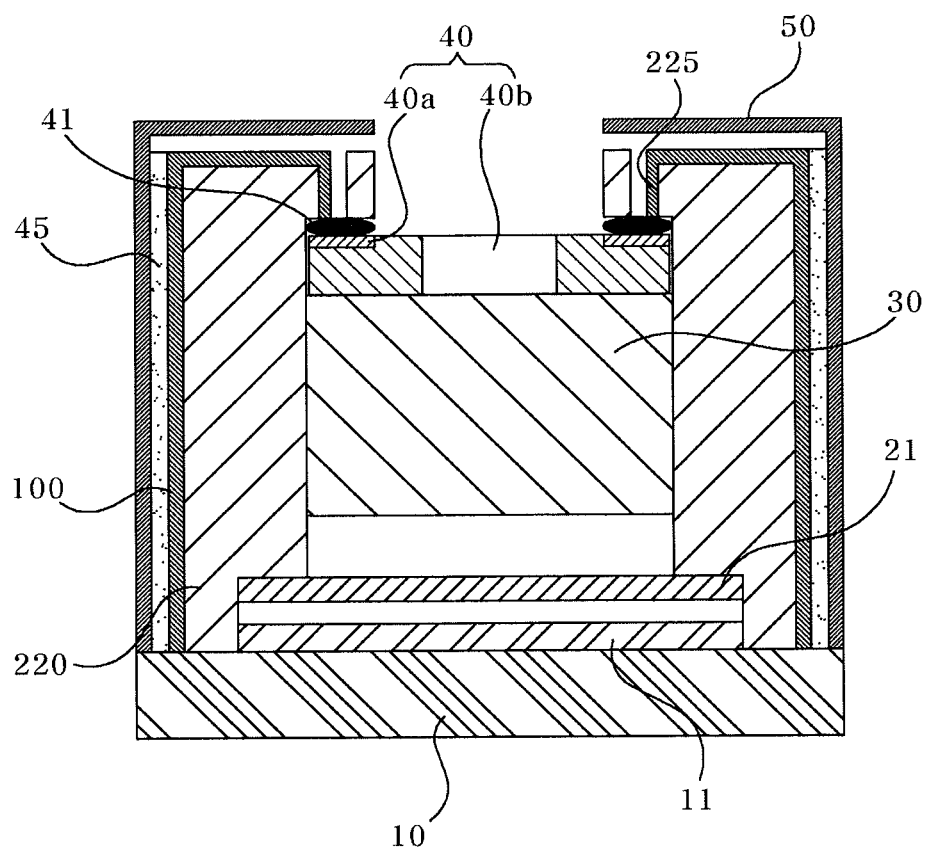
FIG. 4 is a schematic cross-sectional view illustrating a camera module according to a third exemplary embodiment of the present disclosure.
Figure 5:
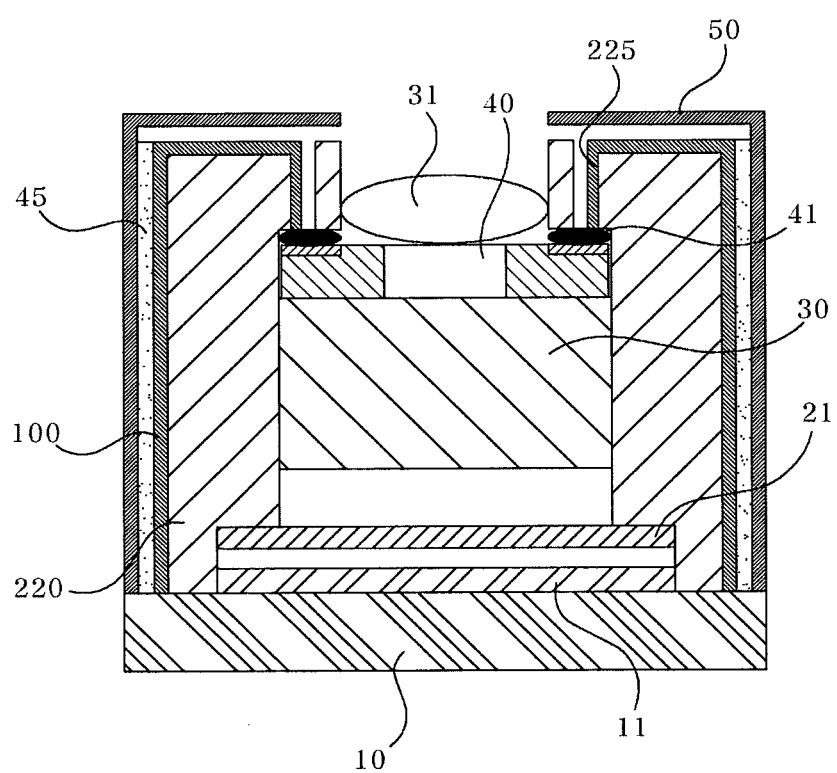
FIG. 5 is a schematic cross-sectional view illustrating a camera module according to a fourth exemplary embodiment of the present disclosure.
Figure 6:
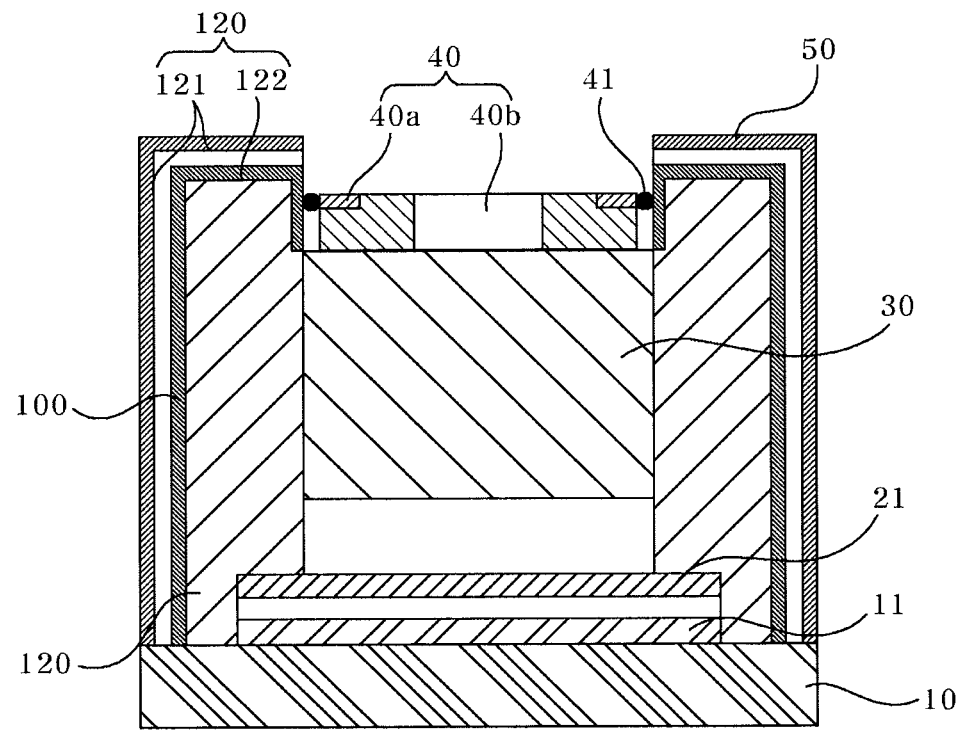
FIG. 6 is a schematic cross-sectional view illustrating a camera module according to a fifth exemplary embodiment of the present disclosure.
Figure 7:
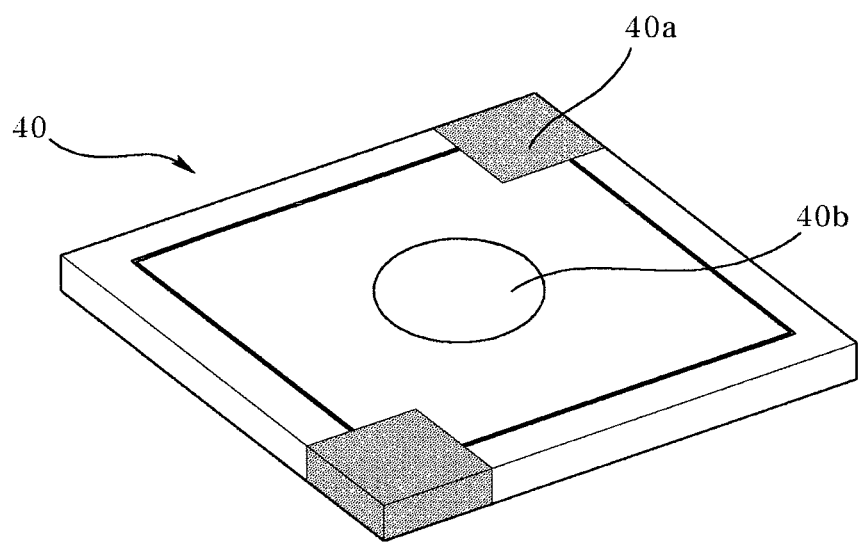
FIG. 7 is a perspective view illustrating an example of an actuator applicable to the first to fifth exemplary embodiments of the present disclosure.

FIGS. 1 and 2 are schematic cross-sectional views illustrating a camera module according to a first exemplary embodiment of the present disclosure, FIG. 3 is a schematic cross-sectional view illustrating a camera module according to a second exemplary embodiment of the present disclosure, FIG. 4 is a schematic cross-sectional view illustrating a camera module according to a third exemplary embodiment of the present disclosure, FIG. 5 is a schematic cross-sectional view illustrating a camera module according to a fourth exemplary embodiment of the present disclosure, FIG. 6 is a schematic cross-sectional view illustrating a camera module according to a fifth exemplary embodiment of the present disclosure, and FIG. 7 is a perspective view illustrating an example of an actuator applicable to the first to fifth exemplary embodiments of the present disclosure.

The camera module according to the first to fifth exemplary embodiments of the present disclosure is a focus non-adjusting type camera module having no focusing process. That is, the focus non-adjusting type camera module may include a holder member (20), where an inner surface of the holder member (20) may be directly mounted with a lens unit (30) formed with at least one lens or a lens module formed with a lens barrel (not shown). Now, a configuration where the lens unit (30) is directly mounted at an inner surface of the holder member (20) will be described according to the first to fifth exemplary embodiments of the present disclosure.

Referring to FIGS. 1 and 2, a camera module according to the first exemplary embodiment of the present disclosure includes a PCB (10), a holder member (20), and an actuator (40).

The PCB (10) may be formed with an image sensor (11) at an approximate center thereof to read out image information, and may be mounted at a surface thereof with the image sensor (11) and a controller outputting data and a control signal of the actuator (40). At this time, the actuator (40) and the PCB (10) may be conductibly connected to an electronic circuit pattern (100) formed on a surface of the holder member (20) by using a surface electrode pattern forming technology. Also, the electronic circuit pattern (100) can be electronic circuit pattern.

The holder member (20) may be arranged on an upper surface of the PCB (10) and may be directly mounted with a lens unit (30) formed therein with one or more lenses. That is, the holder member (20) and the lens unit (30) may be integrally formed to be insert injection molded, or the lens may be directly coupled to the holder member (20).

Furthermore, the actuator (40) may be installed at any one place of an upper surface of the holder member (20), an upper surface of the lens unit (30), an upper surface of a first lens (31) of the lens unit (30), an upper surface of lens module and a first lens (31) of the lens module. The actuator (40) can automatically adjust a focus of an image captured by the image sensor (11). The configuration of the actuator (40) will be described in detail later.

A surface of the holder member (20) may be formed with an electronic circuit pattern (100) conductively connected to the PCB (10). The electronic circuit pattern (100) is formed to allow a surface of the holder member (20) to have a wiring pattern. The electronic circuit pattern (100) may be formed using the so-called surface electrode pattern forming technology, or may be formed by insert injection molding of metal-materialed wiring members.

A distal end of the electronic circuit pattern (100) is connected to the PCB (10), and the other opposite distal end of the electronic circuit pattern (100) is conductively connected to the actuator (40). Thus, the actuator (40) and the PCB (10) may be conductively connected by the electronic circuit pattern (100).

The surface electrode pattern forming technology may be categorized into three methods.

A first method is a patterning method using a dual forming, where a part forming the holder member (20) and a part forming the electronic circuit pattern (100) are injection molded using mutually different synthetic resins. That is, the part of the holder member (20) is injection-molded is injection-molded using an insulation material, while the part for forming the electronic circuit pattern (100) is injection molded with a conductible synthetic resin, or with a metal plating-easy synthetic resin, and the electronic circuit pattern (100) is completed by using a post processing such as electroplating.

The second method is such that the holder member (20) is injection molded with impurities reactive to heat and light included, and an exposed lateral wall surface to be formed with the electronic circuit pattern (100) is laser-exposed via a surface patterning process to the injection-molded holder member (20) such as laser lithography to form the electronic circuit pattern (100) thereon. If the electronic circuit pattern (100) is formed by the above method, SMDs (surface-mount devices) or electronic accessory parts can be directly mounted because the electronic circuit pattern (100) itself has a conductible property.

Meanwhile, the third method is a method in which an entire surface is metalized, where an entire surface of the holder member (20) is metalized to form the electronic circuit pattern (100) on the exposed surface. That is, only the part to be formed with the electronic circuit pattern (100) remains untouched while the remaining part is etched to allow the electronic circuit pattern (100) to be integrally formed on the surface of the holder member (20).

Meanwhile, the electronic circuit pattern (100) provided by the above surface electrode pattern forming technology is formed on the exposed surface of the holder member (20). However, the present disclosure is not limited thereto, and the electronic circuit pattern (100) may be formed both on the exposed external surface of the holder member (20) and on the non-exposed internal surface of the holder member (20), or formed on any one of exposed or non-exposed surface. This is to select the arrangement of the electronic circuit pattern (100) on a single surface or a double surface according to wiring requirement for component mounting. Hence, if there is a need to mount a large number of electronic components, an exterior surface of the holder member (20) and an interior surface are also formed by the above methods with the electronic circuit pattern (100) to which components can be mounted.

Meanwhile, the connection through mechanism or equipment of insert method may be possible, instead of forming the electronic circuit pattern (100) using the above surface electrode pattern forming technology. That is, the insert injection may be used when the holder member (20) is injection molded for metal-materialed terminal member for forming the electronic circuit pattern (100).

If the electronic circuit pattern (100) is thus formed on the surface of the holder member (20), there is no need of preparing a separate connection member such as a PCB as illustrated in FIG. 1. As a result, the actuator (40) and a terminal of the PCB (10) can be directly connected using the electronic circuit pattern (100) formed on the surface of the holder member (20), whereby a space for installing components can be reduced for easy application to miniaturized electronic products, and assembly process can be simplified to enhance the reliability as well.

The lens unit (30) is sequentially arranged with at least one sheet of lenses to capture an external image toward the image sensor (11). At this time, the lenses may be installed in the middle thereof with a separate optical mechanism including a shutter unit and an aperture, if necessary.

That is, the lens unit (30) may be sequentially arranged with at least one or more sheets of lenses, and in a case two lenses are arranged on an optical path formed inside the lens unit (30), an optical mechanism formed by the aperture and the shutter unit may be arranged at a space between two sheets of lenses, at a space between the lenses and the actuator (40), or at an upper surface of an extreme outer lens, or at a bottom surface of the lens. This arranged relationship may be changed in response to a product design and configuration of camera unit.

An interior of the holder member (20) may be directly coupled by the lens unit (30) according to a first exemplary embodiment of the present disclosure. Furthermore, the actuator (40) may be aligned at an upper surface of the lens unit toward the upper surface of the holder member (20) coupled by the lens unit (30). A tolerance range generated by the alignment of the actuator (40) may be compensated by the actuator (40).

For example, the lens unit (30) is coupled to the holder member (20) based on infinite focusing, and at this time, the lens unit (30) is coupled to the holder member (20) toward a plus (+) side, i.e., closer by 20 μm to 30 μm toward the image sensor (11) over a reference surface of infinite focusing. Furthermore, the actuator (40) at the time of focusing is operated by being compensated as much as an added distance during coupling to the lens unit (30). If the coupling without tolerance or toward a minus (−) side is made, long-range resolution may deteriorate due to a short-range focusing.

Thus, the actuator (40) in the camera module according to the first exemplary embodiment of the present disclosure can compensate the focusing distance based on a position nearer to the image sensor (11). This is because there is a difference from the general focusing and auto focusing method in which a focusing distance is set and focused at 3-4 m to move the actuator (40) for auto focusing.

Meanwhile, although the first exemplary embodiment of the present disclosure has explained and described that the lens unit (30) is directly installed at an inner side of the holder member (20) dispensing with a separate lens barrel, the present disclosure is not limited thereto. For example, one or more sheets of lenses forming the lens unit (30) may be insert injection molded, if necessary, when the holder member (20) is injection molded, and the lens unit (30) may be directly coupled after formation of the holder member (20).

Alternatively, albeit not being illustrated, a lens barrel conventionally supporting a plurality of lenses may be fixedly arranged inside the holder member to replace the lens unit (30).

Various structures may be used for the actuator (40). For example, as illustrated in FIG. 7, the actuator (40) may include a terminal unit (40a) and a variable lens (40b). At this time, the actuator (40) is fixed and needs no movement. The actuator (40) may take various shapes including a circular shape and a doughnut shape in addition to the square shape illustrated in FIG. 7.

The terminal unit (40a) may be installed at any one place of an upper surface, a floor surface, a lateral surface and a surface extended from an upper surface to a lateral surface. The terminal unit (40a) is conductively connected to the electronic circuit pattern (100), and may be conductively connected to the electronic circuit pattern (100) through a connection unit (41) formed with a conductible member including a conductible epoxy such as a solder and an Ag epoxy.

The variable lens (40b) is arranged at an approximate center of the actuator (40) to allow light including an image to pass therethrough. The variable lens (40b) may be formed in a convex shape. The variable lens (40b) is changeable in refractive index in response to a control signal of a predetermined controller, whereby the light including the image can change a focusing position captured by the image sensor (11). At this time, the variable lens (41) may be configured with an LC (Liquid crystal) lens, a liquid lens or a piezoelectric polymer lens.

Turning to FIG. 1 again, a width of the actuator (40) may be formed smaller than that of the holder member (20). However, the present disclosure is not limited thereto, and as shown in FIG. 2, the actuator (40) may have a width corresponding to that of an upper surface of the holder member (20). In this case, the width of the actuator (40)

preferably has a width smaller than that of holder member (20) for miniaturization of the camera module. The size of the holder member (20) may be changed based on the size of the integrally formed lens unit (30). The holder member (20) may take a variable shape including a cylinder and a cube based on design of the camera module. However, the holder member (20) must be greater than the width of the actuator (40).

If the actuator (40) is formed smaller than the holder member (20), the actuator (40) is fixed to an upper surface of the lens unit (30) as illustrated in FIG. 1. Furthermore, a guide holder member (55) may be arranged at an upper surface of the holder member (20). The guide holder member (55) serves to protect the actuator (40), and prevents the shield can (50) and the electronic circuit pattern (100) from being short-circuited by being interposed between the shield can (50) and the electronic circuit pattern (100). The guide holder member (55) will be described in detail later along with the shield can (50).

If the actuator (40) is formed greater than the lens unit (30), the actuator (40) is fixed to an upper surface of the holder member (20) as illustrated in FIG. 2. In this case, the shield can (50) may be arranged by being discrete at a predetermined distance (G) from the upper surface of the actuator (40).

Meanwhile, although FIG. 1 has explained and described that the terminal unit (40a) is formed at a floor surface of the actuator (40), the present disclosure is not limited thereto. For example, the terminal unit (40a) may be formed at an upper surface or a lateral surface of the actuator (40) as described above. At this time, the electronic circuit pattern (100) formed on the holder member (20) needs to change a height of the holder member (20) to allow being changed in position based on the position of the terminal unit (40a). For example, in a case the terminal unit (40a) is formed at the upper surface of the actuator (40), a height of the upper surface of the holder member (20) may be formed in correspondence with the upper surface of the actuator (40). Then, the actuator (40) may be arranged inside the holder member (20).

According to the first exemplary embodiment of the present disclosure, a surface opposite to the image sensor (11) of the lens unit (30) may be arranged with an infrared cut-off member (21). However, the present disclosure is not limited thereto, and an infrared cut-off coating may be performed on a plurality of lenses or variable lens forming the lens unit (30) dispensing with a separate infrared cut-off filter. In this case, an assembly process of a camera module can be reduced and the height of the camera module can be lowered due to no need of a separate infrared cut-off filter.

Although the first exemplary embodiment of the present disclosure has explained and described that the infrared cut-off member (21) is installed between an extreme rear lens of the lens unit (30) and the image sensor (11) as illustrated in FIG. 1, the present disclosure is not limited thereto, and the infrared cut-off member (21) may be provided on an extreme first lens of the lens unit (30), or provided between a plurality of lenses mounted on the lens unit (30), or may be coated on the lenses, or an existing infrared cut-off filter member may be formed inside a space unit. That is, any one surface of a lens in the plurality of lenses may be coated, or a separate infrared cut-off filter member may be used.

Meanwhile, although the abovementioned exemplary embodiment of the present disclosure has described and illustrated that the actuator (40) is formed with the variable lens of an LC lens, liquid lens or a piezoelectric polymer lens, and refractive index of passing light is changed, without physically moving one sheet of lens, to perform auto focusing and handshake compensating functions, it should be apparent that the present disclosure is not limited thereto.

The actuator (40) may be so configured as to perform a zooming function and a shutter function in addition to the auto focusing and handshake compensating functions. Furthermore, the actuator (40) may be replaced by any actuator capable of controlling one sheet of lens such as an actuator using a piezoelectric polymer and movable by using electrostatic force or a piezoelectric force.

That is, by way of non-limiting example, the actuator may be any one of a MEMS (Micro Electric Mechanical System) actuator capable of moving by using the electrostatic force or the piezoelectric force, a MEMS piezoelectric actuator, a MEMS bimorph actuator, an MEMS thermal actuator, a MEMS magnetic actuator, a MEMS liquid actuator, a non-MEMS type actuator, a silicon type actuator, and a liquid lens, or any type of actuator that is configured by combination thereof.

Meanwhile, a metal-materialed shield can (50) may be separately formed at an outside of the holder member (20). In this case, an insulation member (45) such as an insulation epoxy may be coated between the electronic circuit pattern (100) and the shield can (50), whereby short-circuit can be prevented between the electronic circuit pattern (100) and the shield can (50) using the insulation member (45).

Furthermore, as in the first exemplary embodiment of the present disclosure illustrated in FIG. 1, a protective guide member (55) is installed at an upper surface of the holder member (20). The protective guide member (55) may be interposed between the electronic circuit pattern (100) and the shield can (50), whereby an upper surface of the protective guide member (55) may be brought into a surface-contact with the shield can (50), while an opposite surface may be brought into a surface-contact with the holder member (20).

Particularly, an upper surface of the holder member (20) is formed with an exposed surface where the electronic circuit pattern (100) is exposed. Thus, the protective guide member (55) may be brought into surface-contact with the exposed surface to prevent the exposed surface of the electronic circuit pattern (100) from contacting the shield can (50).

Meanwhile, the protective guide member (55) may be formed with an insulation material to prevent the conductively materialed shield can (50) from being contacted to and short-circuited with the electronic circuit pattern (100). Furthermore, the protective guide member (55) may also prevent the electronic circuit pattern (100) exposed to the upper surface of the holder member (20) from being damaged by interference with other components or infuse of foreign objects.

The protective guide member (55) may be formed higher than the actuator (40) to allow performing to protect the actuator (40), and may be provided with various shapes including a ring shape, a square donut shape and a line shape.

Meanwhile, the exposed surface exposed by being formed at an upper surface of the holder member (20) on the electronic circuit pattern (100) may be arranged on a same planar surface with a terminal provided on the actuator (40), and may be directly connected at the connection unit (41) to the terminal or to a conductible member including a solder, or a conductive epoxy such as an Ag epoxy.

FIG. 3 is a schematic cross-sectional view illustrating a camera module according to a second exemplary embodiment of the present disclosure.

The camera module according to the second exemplary embodiment of the present disclosure is structurally same as that of the first exemplary embodiment illustrated in FIG. 1, except that the protective guide member (55) is provided with a guide holder (120) integrally formed with the holder member (20).

The guide holder (120) is arranged at an upper surface of the PCB (10), and may be directly installed at an inside thereof with a lens unit (30) formed therein with one or more lenses. Thus, the lenses arranged on the lens unit (30) are integrally formed with the guide holder (120). The guide holder (120) may be installed at an upper surface with an actuator (40) for automatically adjusting a focus of an image captured by the image sensor (11).

At this time, a lug (121) having a shape corresponding to that of the protective guide member (55, see FIG. 1) of the first exemplary embodiment may be formed at an external lateral surface of the actuator (40). A height of an upper surface of the lug (121) may be higher than that of the upper surface of the actuator (40).

A surface of the guide holder (120) may be formed with the electronic circuit pattern (100) conductively connected to the PCB (10) mounted with the image sensor (11). At this time, the electronic circuit pattern (100) may be formed at a lateral surface of the guide holder (120), at an upper surface of the lug (120) and at an inner concave circumferential surface installed with the actuator (40).

Hence, as illustrated in FIG. 3, a terminal unit (40a) formed at the lateral surface of the actuator (40) may be conductively connected to the electronic circuit pattern (100) formed at an exposed portion of the inner surface of the guide holder (120) through a connection unit (41) formed with a conductible member including a solder or conductive epoxy such as an Ag epoxy.

At this time, the terminal unit (40A) may be formed at an upper surface of the actuator (40) as shown in FIG. 3(a), formed at a lateral surface of the actuator (40) as shown in FIG. 3(b), or formed at a floor surface of the actuator (40) as shown in FIG. 3(c). The terminal unit (40a) may be formed at a position corresponding to that of the electronic circuit pattern (100) according to an arrangement position of the terminal unit (40a).

Thus, according to this configuration, only the guide holder (120) can prevent the actuator (40) from being interfered with other components dispensing with a separate protective guide member (55, see FIG. 1). However, in a case a shield can (50) is added, the electronic circuit pattern (100) exposed on the upper surface of the guide holder (120) may be discretely installed at a predetermined distance (G) from the shield can (50) as illustrated in FIG. 2 in order to avoid a short-circuit with the shield can (50).

Although not illustrated, an insulation member such as a separate adhesive member or a spacer may be interposed between the shield can (50) and the electronic circuit pattern (100) exposed on the upper surface of the guide holder (120), or may be disposed at an upper surface of the electronic circuit pattern (100). At this time, the insulation member may be so installed as to surface-contact an entire upper surface of the guide holder (120), or may be so installed as to contact only an area formed with the electronic circuit pattern (100).

FIG. 4 is a schematic cross-sectional view illustrating a camera module according to a third exemplary embodiment of the present disclosure.

The camera module according to a third exemplary embodiment of the present disclosure is characteristically and structurally same as that of the second exemplary embodiment, except that an actuator holder (220) is provided to cover an upper surface of the actuator (40) by changing a shape of the guide holder (120, see FIG. 2).

The actuator holder (220) is arranged at an upper surface of the PCB (10), and a lens unit (30) and an actuator (40) are directly installed inside of the actuator holder (220). The actuator holder (220) is directly installed thereinside with a lens unit (30) formed with one or more lenses. An upper surface of the lens unit (30) may be installed with an actuator (40) configured to automatically adjust a focus of an image captured by the image sensor (11). At this time, as illustrated in FIG. 4, the actuator (40) is configured such that an upper surface of the actuator holder (220) wraps the actuator (40). Thus, the actuator (40) may be arranged lower than the upper surface of the actuator holder (220).

Meanwhile, the upper surface of the actuator (40) is provided with at least two terminal units (40a), as illustrated in FIG. 7. As a result, at least two through holes (225) may be formed at a position corresponding to that of the terminal unit of the actuator (40) at the upper surface of the actuator holder (220). The actuator (40) and the electronic circuit pattern (100) can be conductively connected through the through holes (225). For example, a separate wiring member may be inserted to allow passing through the through hole (225), and the electronic circuit pattern (100) may be extensively formed at an inner circumferential surface of the through hole (225) as illustrated in FIG. 4.

That is, a surface, i.e., a lateral wall and an upper surface, of the actuator holder (220) is formed with the electronic circuit pattern (100) conductively connected to the PCB (10) mounted with the image sensor (11). At this time, the electronic circuit pattern (100) may be extensively formed to an inner circumferential surface of the through hole (225). Then, as illustrated in FIG. 4, the terminal unit (40a) formed at the upper surface of the actuator (40) may be conductively connected at a bottom surface to the electronic circuit pattern (100) through a connection unit (41) formed with a conductible member including a solder or conductive epoxy such as an Ag epoxy. Other configurations are same as those of the first and second exemplary embodiments.

Although not illustrated, in case of being connected to the actuator by forming a through hole (225) at the actuator holder (220), a separate mechanism such as the shield can (50) configured to protect the actuator (40) may be omitted. Of course, even in this case, the actuator holder (220) and the shield can (50) need to be discretely installed at a predetermined distance (G).

FIG. 5 is a schematic cross-sectional view illustrating a camera module according to a fourth exemplary embodiment of the present disclosure.

The camera module according to the fourth exemplary embodiment of the present disclosure is different from that of the third exemplary embodiment in light of arranged positions of the lens unit (30) and the actuator (40). That is, the third exemplary embodiment is configured such that the lens unit (30) and the actuator (40) are installed inside the actuator holder (220), and the actuator (40) is arranged at an upper surface of the lens unit (30). However, the fourth exemplary embodiment of the present disclosure is differently configured such that the installation position of the actuator (40) is changed to a bottom end of an extreme outer lens (31) in the lenses of the lens unit (30), as illustrated in FIG. 5 of the fourth exemplary embodiment.

At this time, a terminal unit (40*a*) of the actuator (40) may be situated at an upper surface of the actuator (40). However, the present disclosure is not limited thereto. For example, the terminal unit (40*a*) may be installed at a lateral surface or a floor surface of the actuator (40) based on the position of the electronic circuit pattern (100). Furthermore, the terminal unit (40*a*) of the actuator (40) may be situated at a surface opposite to the through hole (225) of the actuator (40), as illustrated in FIG. 5.

Meanwhile, a diameter of the extreme outer lens (31) may be smaller than that of the actuator (40) or a lens arranged at the bottom surface of the actuator (40). The fourth exemplary embodiment of the present disclosure is configured such that a connection structure for electrical connection is not exposed to outside, because the actuator (40) is arranged inside the actuator holder (220). Hence, reliability can be enhanced due to no electrical problem such as short-circuit of the electrical connection.

Furthermore, a conductive connection unit such as an Ag epoxy can be cured inside the actuator holder (220) to allow forming an exterior look identical to that of the existing camera module. In addition, the actuator (40) can minimize a problem involving spill lights, because the actuator (40) is arranged inside the actuator holder (220). Besides, mechanisms such as shield can (50) and the protective guide member (55) may be eliminated to be conducive to minimization of the camera module through reduced width, length and height of the camera module.

FIG. 6 is a schematic cross-sectional view illustrating a camera module according to a fifth exemplary embodiment of the present disclosure.

As illustrated in FIG. 6, the fifth exemplary embodiment of the present disclosure is configured such that, similar to the configuration of the second exemplary embodiment, a protrusion (121) and a groove (122) are formed on a guide holder (120), where the protrusion (121) supports the shield can (50), and the groove (122) is formed with the electronic circuit pattern (100) to prevent the electronic circuit pattern (100) from being short-circuited with the shield can (50).

An upper surface of the protrusion (121) may be arranged higher than the actuator (40) to allow the shield can (50) to surface-contact the upper surface and the lateral surface. The groove (122) may be formed with a width corresponding to that of the electronic circuit pattern (100). This configuration may allow the protrusion (121) to function as the insulation member (45) of FIG. 3, thereby eliminating the coating process on the insulation member (45).

Meanwhile, although the first to fifth exemplary embodiments of the present disclosure have explained and described that the actuator (40) and the PCB (10) are conductively connected using the electronic circuit pattern (100) formed by the surface electrode pattern forming technology, the present disclosure is not limited thereto. For example, the electronic circuit pattern (100) may be formed with a metal-materialed wiring member, which is then inserted and injection molded along with the injection molding of the guide holder (120), the actuator holder (220) and the lens unit (30).

Furthermore, although the electronic circuit pattern (100) and the actuator (40), and the electronic circuit pattern (100) and PCB (10) may be connected using a soldering, an Ag epoxy, a conductive epoxy or a wire bonding, the present disclosure is not limited thereto, and any conductible configuration may be also utilized.

The camera module according to the first to fifth exemplary embodiments of the present disclosure employ a focus non-adjustment method free from focusing process. Hence, the position of the terminal unit (40*a*) can be constantly configured in the course of assembly process, and the position of the terminal unit (40*a*) can be also determined based on an arranged position of the electronic circuit pattern (100). Therefore, design freedom to the arrangement of actuator (40) is high.

Furthermore, in a case the actuator (40) is formed with an LC (Liquid Crystal) lens, a liquid lens or a piezoelectric polymer lens, it is possible to manufacture a camera module with a low power consumption due to almost nil power consumption over a camera module with a conventional actuator of VCM (Voice Coil Motor).

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera module, the camera module comprising:
a PCB (Printed Circuit Board) mounted with an image sensor;
a holder member disposed on an upper surface of the PCB;
a lens module coupled to the holder member;
an actuator disposed on the lens module;
an electronic circuit pattern formed on an upper surface of the holder member and an outer lateral surface of the holder member, the electronic circuit pattern electrically connected with the PCB and the actuator;
a shield can disposed outside of the holder member and spaced from the electronic circuit pattern; and
a protective guide member installed at the upper surface of the holder member,
wherein the protective guide member is interposed between the electronic circuit pattern and the shield can, and
wherein the actuator is disposed inside the protective guide member.

2. The camera module of claim 1, wherein an upper surface of the lens module is positioned at a height corresponding with a height of the upper surface of the holder member.

3. The camera module of claim 1, wherein a bottom surface of the actuator contacts an upper surface of the lens module, and
wherein the electronic circuit pattern formed on the upper surface of the holder member is connected with a bottom end of a lateral surface of the actuator.

4. The camera module of claim 1, further comprising:
a first insulation member disposed between the shield can and the electronic circuit pattern, and
a second insulation member disposed between the shield can and the protective guide member.

5. The camera module of claim 1, wherein an upper surface of the protective guide member is positioned above an upper surface of the actuator and a width of the lens module is smaller than a width of the actuator.

6. The camera module of claim 1, wherein a bottom surface of the actuator contacts an upper surface of the lens module and the upper surface of the holder member, and
wherein the electronic circuit pattern formed on the upper surface of the holder member is connected with a bottom surface of the actuator.

7. The camera module of claim 1, wherein an upper surface of the actuator is positioned lower than an inner surface of an upper plate of the shield can, and wherein a portion of the actuator is overlapped with the upper plate of the shield can in an up-down direction.

8. The camera module of claim 1, wherein the lens module includes at least one lens and a lens barrel accommodating the lens.

9. The camera module of claim 1, wherein the lens module includes at least one lens directly mounted to the holder member.

10. The camera module of claim 4, wherein the first insulation member includes an epoxy.

11. The camera module of claim 1, wherein the actuator includes any one of a MEMS (Micro Electric Mechanical System) actuator moved by using an electrostatic force and a piezoelectric force, a liquid crystal lens, a piezoelectric polymer lens, a non-MEMS actuator, a silicon type actuator, and a liquid lens, or a combination of at least two such actuators.

12. The camera module of claim 1, wherein the actuator performs an auto focusing function or a handshake compensation function through changes in thickness or shape of a fixed lens or changes in refractive indexes of incident light.

13. The camera module of claim 1, wherein the electronic circuit pattern and the actuator are connected using a soldering, an Ag epoxy, a conductive epoxy or a wire bonding.

14. An optical apparatus, the optical apparatus comprising:
a PCB (Printed Circuit Board) mounted with an image sensor;
a holder member disposed on an upper surface of the PCB;
a lens module coupled to the holder member;
an actuator disposed on the lens module;
an electronic circuit pattern formed on an upper surface of the holder member and an outer lateral surface of the holder member, the electronic circuit pattern electrically connected with the PCB and the actuator;
a shield can disposed outside of the holder member and spaced from the electronic circuit pattern; and
a protective guide member installed at the upper surface of the holder member,
wherein the protective guide member is interposed between the electronic circuit pattern and the shield can, and
wherein the actuator is disposed inside the protective guide member.

* * * * *